United States Patent [19]
Brown et al.

[11] Patent Number: 4,761,724
[45] Date of Patent: Aug. 2, 1988

[54] TRANSFORMER COUPLING FOR TRANSMITTING DIRECT CURRENT THROUGH A BARRIER

[75] Inventors: Ralph L. Brown; Richard P. Guilford; John H. Stichman, all of Albuquerque, N. Mex.

[73] Assignee: The United States as represented by the United States Department of Energy, Washington, D.C.

[21] Appl. No.: 67,026

[22] Filed: Jun. 29, 1987

[51] Int. Cl.$^4$ .................. H02M 3/335; H01F 21/06
[52] U.S. Cl. .................. 363/21; 323/902; 336/132; 361/215
[58] Field of Search .................. 363/18–21, 363/95, 98, 131; 323/902; 336/132, 135; 361/91, 215

[56] References Cited

U.S. PATENT DOCUMENTS

| | | | |
|---|---|---|---|
| 3,824,129 | 7/1974 | Fagan, Jr. | 128/391 |
| 3,909,702 | 9/1975 | Hart | 323/902 X |
| 3,921,114 | 11/1975 | Bridewell et al. | 336/135 X |
| 3,963,975 | 6/1976 | Gauper, Jr. et al. | 336/84 R X |
| 3,973,170 | 8/1976 | Hogan | 361/91 X |
| 4,031,496 | 6/1977 | Fujiwara et al. | 336/135 |
| 4,041,364 | 8/1977 | Gauper, Jr. | 307/150 X |
| 4,112,404 | 9/1978 | Boushey | 336/135 X |
| 4,210,947 | 7/1980 | Koizumi | 361/98 X |
| 4,236,196 | 11/1980 | Koizumi et al. | 363/21 |
| 4,378,585 | 3/1983 | Bete | 323/902 X |
| 4,556,927 | 12/1985 | Steger | 361/215 |

OTHER PUBLICATIONS

"Wide Range Uniformly High Efficiency DC-DC Converter", W. C. Singleton, IBM Technical Disclosure Bulletin, vol. 15, No. 4, 9/1972.
Sandia Report SC-4941 (RR), "Transmission of Power and Information Across Dielectric Barriers", Sep. 1963, Frankel et al.

Primary Examiner—Patrick R. Salce
Assistant Examiner—Emanuel Todd Voeltz
Attorney, Agent, or Firm—George H. Libman; James H. Chafin; Judson R. Hightower

[57] ABSTRACT

The transmission system for transmitting direct current from an energy source on one side of an electrical and mechanical barrier to a load on the other side of the barrier utilizes a transformer comprising a primary core on one side of the transformer and a secondary core on the other side of the transformer. The cores are magnetically coupled selectively by moving a magnetic ferrite coupler in and out of alignment with the poles of the cores. The direct current from the energy source is converted to a time varying current by an oscillating circuit, which oscillating circuit is optically coupled to a secondary winding on the secondary core to interrupt oscillations upon the voltage in the secondary winding exceeding a preselected level.

6 Claims, 3 Drawing Sheets

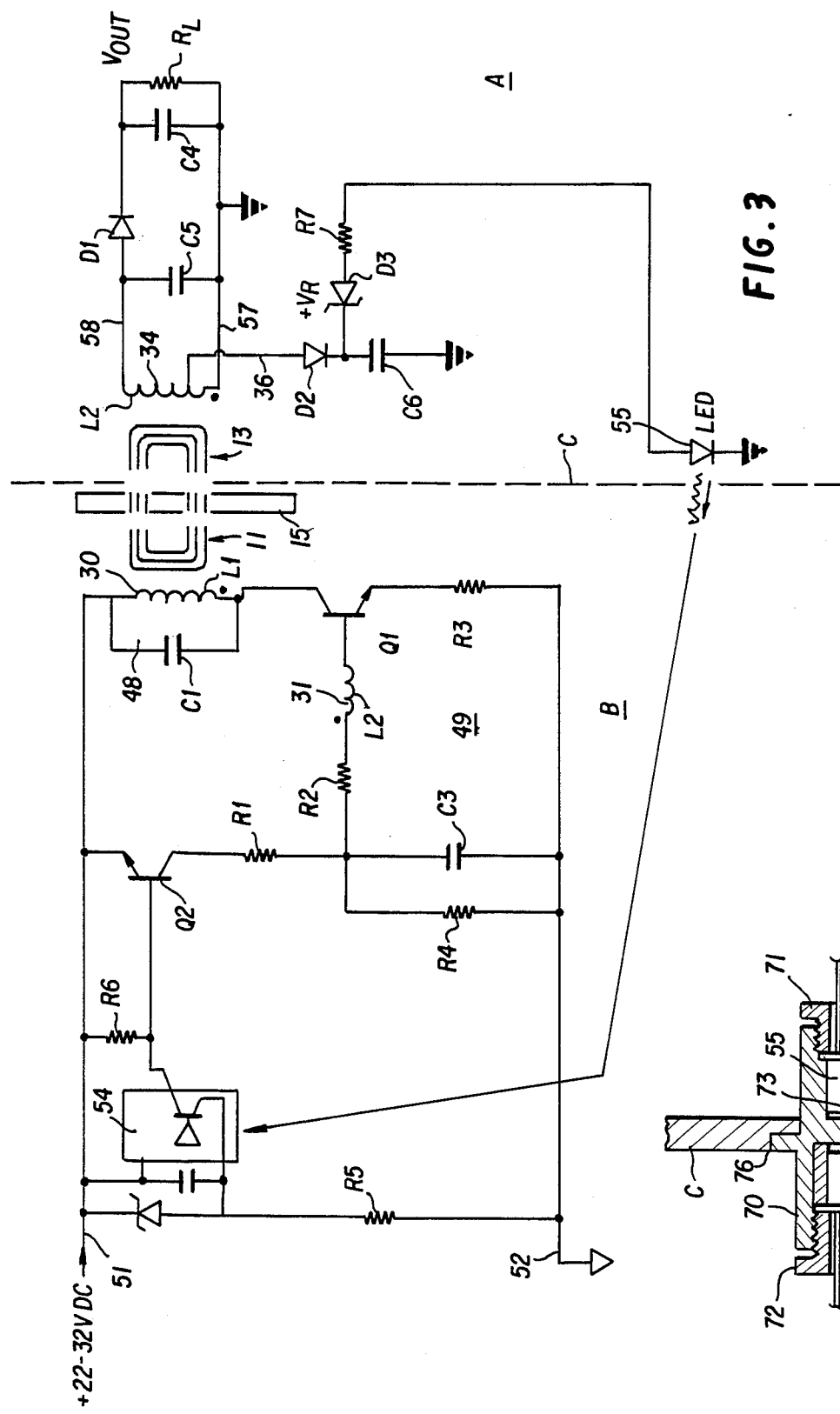

TRANSFORMER COUPLING FOR TRANSMITTING DIRECT CURRENT THROUGH A BARRIER

The U.S. Government has rights in this invention pursuant to Contract No. DE-AC04-76DP00789 between the U.S. Department of Energy and AT&T Technologies, Inc.

BACKGROUND OF THE INVENTION

The instant invention relates to transformer couplings for transmitting direct current from an energy source on one side of an electrical and mechanical barrier to a load on the other side of the barrier. More particularly, the instant invention relates to such a coupling wherein optical feedback is utilized to regulate output voltage.

It is frequently desirable or necessary to transmit electrical energy through an electrically and mechanically impervious barrier. The conventional approach is to utilize electrical connectors. However, electrical connectors cannot maintain seal integrity in many situations and are susceptible to tampering. Other approaches utilize mechanical switch contacts or motor generator arrangements to effect energy transfer across electrical and mechanical barriers; however, such arrangements, while not necessarily accident prone, are not accident proof either. Accordingly, there is a need to provide an arrangement for transferring energy across barriers safely in hazardous environments, such as environments in which nuclear materials, explosives or toxins are present.

While there are a number of patents which disclose magnetic couplings between transformers, none of these patents disclose an arrangement for selectively passing or blocking magnetic coupling between transformer windings by using a mechanically moveable coupling. For example, U.S. Pat. Nos. 4,236,196 and 4,210,947 relate to a switching regulator design wherein a pulse-width modulation scheme is disclosed in which physical movement of a core is used to cause saturation and increased current. The increased current is sensed by an oscillator circuit used to shut off the oscillator drive. In these patents, magnetic isolation of transformer sections is not disclosed. U.S. Pat. Nos. 4,041,364 and 4,236,196 disclose shielded transformer designs directed to suppressing radio frequency interference from inverter switching transients. However, in these patents there is no disclosure of magnetic shielding between windings or control of the magnetic coupling between windings. U.S. Pat. No. 3,824,129 discloses a battery and regulator coupled through a pair of RF coils but contains no disclosure of magnetic iron circuitry or of shielding. These same general considerations are applicable to the disclosure of U.S. Pat. Nos. 4,031,496 and 3,921,114.

In view of the aforementioned considerations, there is a need for an improved approach for transmitting electrical energy across a mechanical and electrical barrier.

SUMMARY OF THE INVENTION

A barrier transmission system for transmitting direct current from an energy source on a first side of an electrical and mechanical barrier to a load on a second side of the electrical and mechanical barrier comprises primary and secondary transformer cores disposed on the first and second sides of the barrier, respectively. Means are disposed between the primary and secondary transformer cores for selectively coupling and decoupling the transformer cores from one another so as to cause or interrupt transmission of magnetic flux across the barrier. In order to effect the magnetic coupling, the direct current input is fed through a self-excited oscillator circuit connected to the winding of the primary transformer core so as to create a time varying magnetic field, which magnetic field is passed through the barrier to a winding on the secondary transformer core with the winding being tuned to the frequency of the field. The output from the secondary winding is rectified, filtered and used to supply the output load. Voltage regulation is accomplished by tapping the secondary winding to provide an electrical signal which is optically coupled back through the barrier to turn the input oscillator circuit on and off at a rate inversely proportional to the level of the DC input voltage.

In accordance with the preferred embodiment of the invention, the transformer cores are C-cores with the poles thereof facing one another and oriented angularly at 90° with respect to one another. The magnetic coupling and decoupling means comprises a pair of semicircular, magnetic ferrite plates, separated by a gap, and being selectively aligned with and displaced from the poles of the C-cores.

BRIEF DESCRIPTION OF THE DRAWINGS

Various other objects, features and attendant advantages of the present invention will be more fully appreciated as the same becomes better understood when considered in connection with the accompanying drawings, in which like reference characters designate the same or similar parts throughout the several views, and wherein:

FIG. 3 is a circuit diagram illustrating input and output oscillating circuits on opposite sides of a barrier, which circuits are magnetically and optically coupled in accordance with the principles of the instant invention; and FIG. 4 is a longitudinal cross-section through an optical coupler used with the circuit of FIG. 3.

DESCRIPTION OF THE PREFERRED EMBODIMENT

Figure 1:
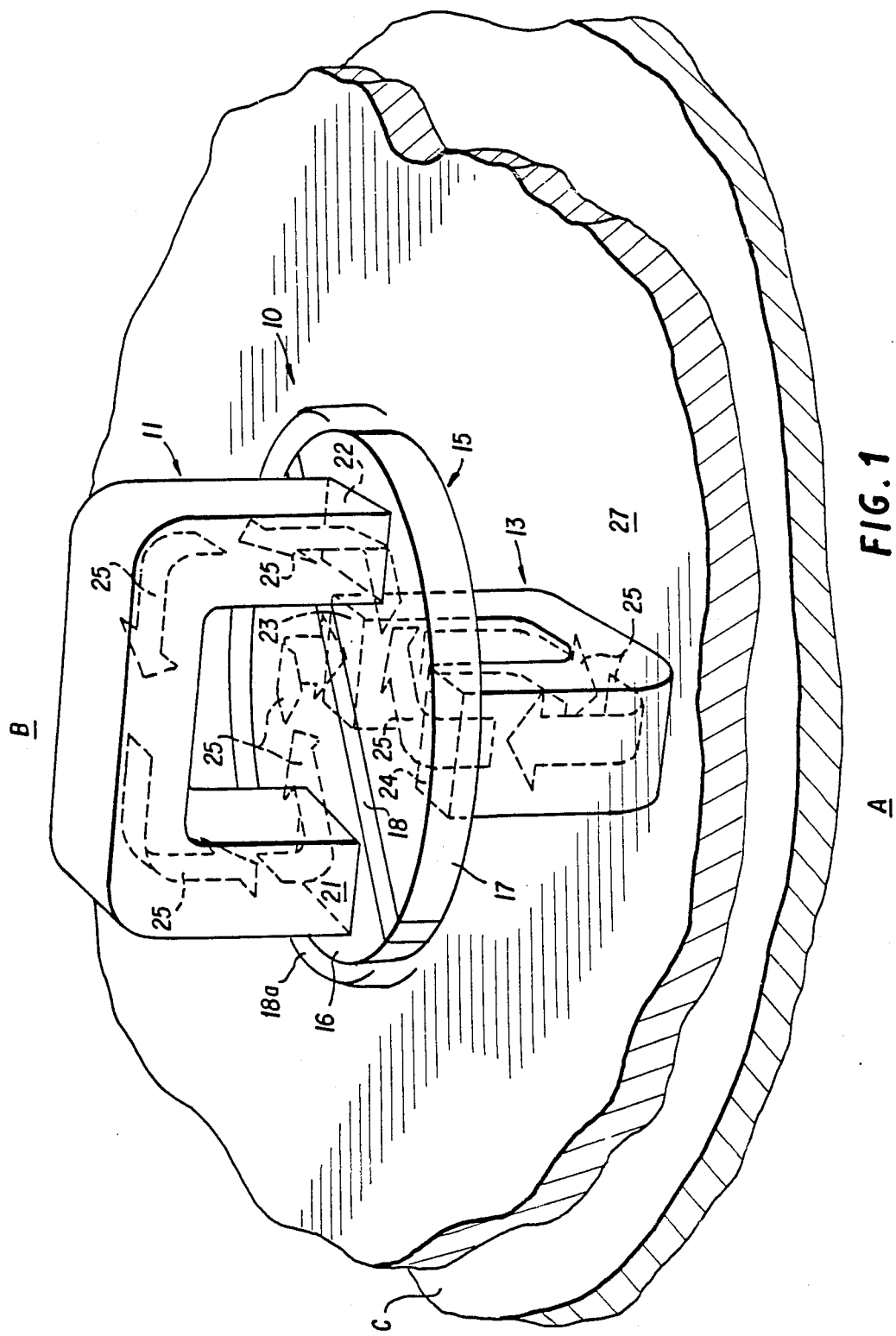
FIG. 1 is a perspective view schematically illustrating the principles of the instant invention.

As is seen in the drawings, a barrier C separates a space A from a space B. The barrier C is made of a magnetic material such as stainless steel and may for example be the wall of a container defining the space A. Space A may be a secured space containing a hazardous substance such as, for example, an explosive, a radioactive material or a toxic material. Often it is necessary to deliver power to the space A from an adjacent space B without comprising the barrier C. The apparatus of the instant invention accomplishes this by magnetically coupling two cores of a transformer through the barrier C.

Referring now to FIG. 1, there is shown a transformer coupling, designated generally by the numeral 10, arranged to illustrate a principle feature of the instant invention wherein the magnetic flux in a primary C-core, designated generally by the numeral 11, is transmitted across the mechanical and electrical barrier C to a secondary C-core, designated generally by the numeral 13, via a ferrite coupling designated generally by the numeral 15. The ferrite coupling 15 has a circular configuration with first and second generally arcuate portions 16 and 17 separated by a gap 18 of non-magnetic, electrically insulating material. The ferrite coupling 15 is surrounded by region 18a which is non-magnetic. This is required to magnetically isolate the ferrite coupling from the surrounding magnetic material. The C-cores 11 and 13 are arranged with their poles 21, 22 and 23, 24, respectively, facing one another across the barrier C but angularly displaced 90° with respect to one another. In addition, the C-cores 11 and 13 are arranged so that the poles 21 and 22 of the primary C-core are magnetically coupled to the corresponding poles 23 and 24 of the secondary C-core 13 via the coupling ferrite 15. This is accomplished by aligning the first ferrite element 16 with the pole 21 of the primary C-core 11 and pole 23 of the secondary C-core 13, while aligning the second ferrite element 17 with the pole 22 of primary C-core 11 and the pole 24 of secondary C-core 13. The non-magnetic gap created by non-magnetic material 18 is disposed at a 45° angle with respect to the poles of each C-core. The aforedescribed arrangement creates a continuous magnetic circuit, illustrated by the arrows 25. In accordance with the principles of the instant invention, the ferrite coupling 15 is mounted on a safing wheel 27 which is rotatable so as to selectively carry the coupling 15 in and out of alignment with the poles 21-24. The safing wheel 27 is made of a magnetic shielding material and is preferably a laminated structure with a highly electrically conductive material in the outer layers and a highly magnetically permeable layer on the inside.

Figure 2:
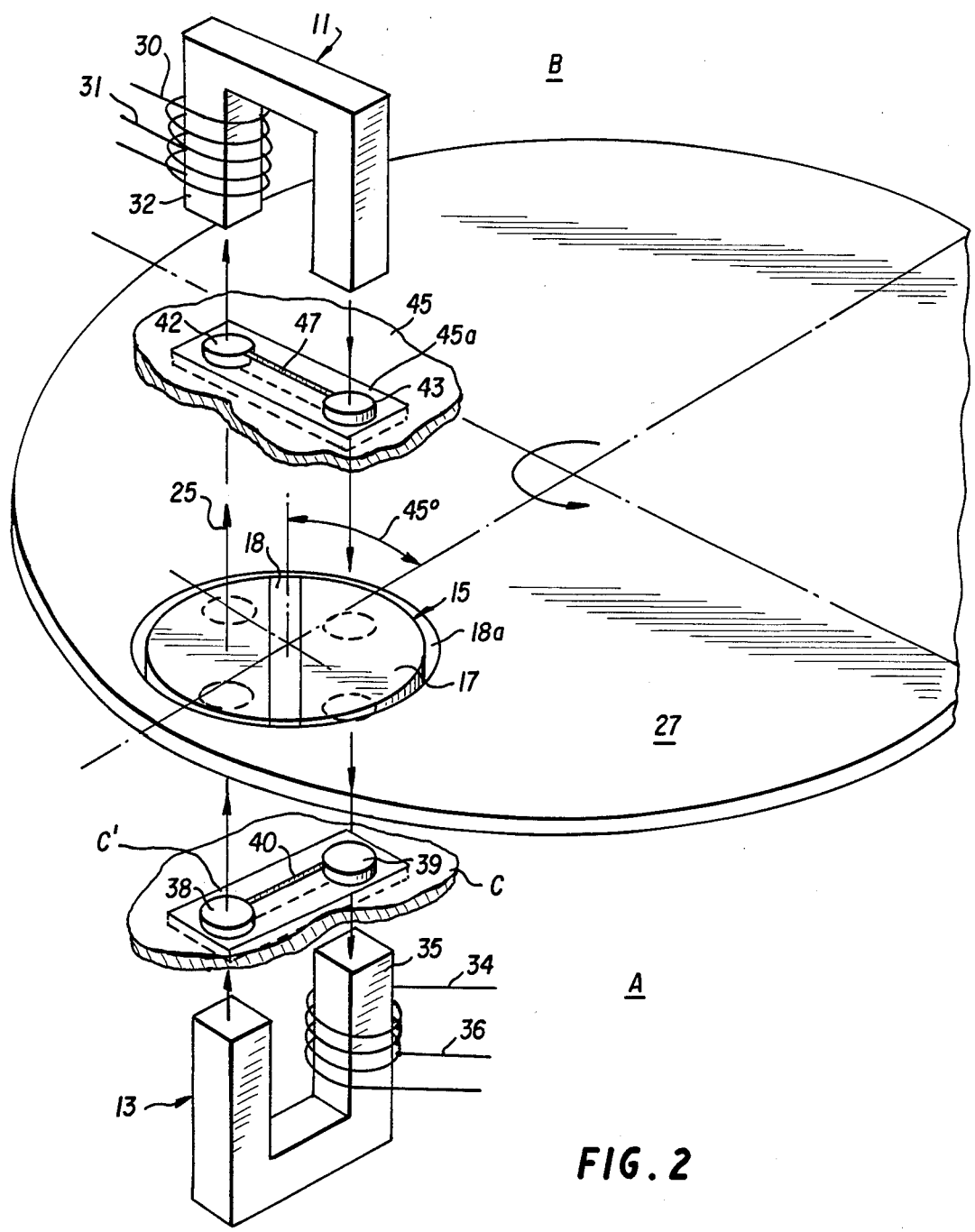
FIG. 2 is an exploded perspective view showing the mechanical and electromechanical components of the system comprising the instant invention.

Referring now to FIG. 2, wherein the invention is illustrated in somewhat greater detail, it is seen that the primary C-core 11 has a primary winding 30 and a feedback winding 31 wound about one leg 32 thereof. The secondary C-core 13 has a secondary winding 34 wound about leg 35, the secondary winding 34 having a tap 36 thereon which is utilized for voltage regulation, as will be further explained hereinafter.

The barrier wall C has a non-magnetic region C'. Region C' preferably has a pair of ferrite buttons 38 and 39 bonded thereto which have a slot 40 extending therebetween. The slot 40 is filled with a non-conductive material so as to eliminate the shorted turn of the electrically conductive barrier around the magnetic path. Likewise, a pair of magnetic ferrite buttons 42 and 43 are disposed in a plate 45a disposed over the safing wheel 27. Plate 45a is a non-magnetic region in magnetic plate 45. A slot 47, filled with non-conducting material also extends between the buttons 42 and 43.

Referring now to FIG. 3, a direct current electrical energy source applies direct current $V_{dc}$ in the range of twenty-two to thirty-two volts over lines 51 and 52 through a tuned circuit 48 comprising the primary winding 30 and a capacitor C1 which determines the frequency of oscillation. The tuned circuit is driven by a self-exciting oscillator circuit 49 comprising a power transistor Q1 oscillating at approximately 25 khz. Oscillations are sustained by means of feedback winding 31, capacitor C3 and resistors R2, R3 and R4. The transistor Q1 is supplied with bias current from the transistor Q2 through resistor R1. The transistor Q2 is switched on and off by an optical detector 54 which is controlled by LED 55 connected to the secondary winding 34 wound on leg 35 of the secondary C-core 13. Transistor Q2 turns on transistor Q1 when there is no light input from LED 55 to optical detector 54 and switches off the transistor Q1 when light is sensed from the LED 55.

Considering now more specifically the phenomenon occurring on the second side of the barrier C within the mechanically and electrically isolated enclosure A, magnetic flux from primary C-core 11 follows the magnetic circuit path illustrated by arrows 25 linking the secondary C-core 13 (see FIG. 1). A tuned circuit formed of the secondary transformer winding 34 on secondary C-core 13 and capacitor C5 oscillates to produce an AC signal on line 58. Diode D1 rectifies the AC voltage on line 58 while capacitor C4 filters the rectified output which is applied to load $R_L$ as direct current $V_{dc\text{-}out}$.

A portion of the AC secondary voltage is tapped from secondary winding 34 via line 36, rectified by diode D2 and filtered by capacitor C6. When the voltage across capacitor C6 exceeds the Zener diode voltage of Zener diode D3 and the forward drop of the LED 55, the LED emits a light output which is picked up by optical detector 54. Optical detector 54 applies a signal to the base of power transistor Q1 so as to turn off the transistor and interrupt the oscillation thereof. The magnitude of the excess voltage applied to LED 55 is proportional to the magnitude of the primary circuit supply voltage $V_{dc}$. When the power transistor Q1 is turned off, C6 discharges slowly through Zener diode D3, resistor R7 and LED 55. Upon the discharge current reaching a threshold level, the LED 55 light output drops below the "on" level sensed by optical detector 54 and oscillations of the power transistor Q1 resume. The discharge time is proportional to the initial voltage on C6 as well as to the primary circuit supply voltage $V_{dc}$. Consequently, the repetition rate of the oscillator Q1 is inversely proportional to the supply voltage $V_{dc}$ and regulation of the output voltage level $V_{out}$ is achieved.

The aforedescribed circuitry in combination with the magnetic coupler provided by the movable ferrite coupling 15 provides a system for coupling a direct current energy source to a load which is isolated from that energy source by an electrical and mechanical barrier C. The invention can be applied to any apparatus requiring seal integrity and enhanced security against tampering. The only additional breach through the stainless steel barrier wall C is the optical coupler 55 which is shown in FIG. 4. This is however, a very secure arrangement in that it is integral with the steel barrier wall C. In a preferred embodiment, both the LED 55 and optical detector 54 are secured within a steel barrel 70 and held in place by nylon nuts 71 and 72. The barrel 70 includes a partition 73 extending thereacross with a bore 74 therethrough which permits transmission of light from the LED 55 to the optical detector 54. Since the barrel 70 is welded by a weld 76 to the steel barrier wall 12, a rigid and secure connection is obtained. The optical link is the only link, other than the flux link between cores 11 and 13, which bridges the barrier C.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A system for transmitting direct current across a mechanical and electrical barrier from an energy source on a first side of the barrier to a load on a second side of the barrier, said system comprising:

transformer means comprising a primary core disposed on the first side of the barrier, a secondary core disposed in alignment with the primary core on the second side of the barrier, a primary winding on the primary core for applying oscillating current thereto, and a secondary winding on the secondary core for applying transmitted energy to the load; means for converting direct current from the direct current energy source into oscillating current for application to the primary winding;

means for converting alternating current from the secondary winding to direct current;

optical link means for optically coupling the oscillating circuit to the secondary winding for regulating voltage on the secondary winding; and mechanical magnetic coupling means selectively movable between a first position and a second position, energy being transmitted from the primary core to the secondary core only when the magnetic coupling means is in the first position.

2. The system of claim 1, wherein each of the primary and secondary cores are C-cores having a pair of poles, the C-cores being positioned with the poles facing across the barrier and angularly displaced 90° from one another;

the magnetic coupling means having two magnetically insulated sections and being disposed in the first position in selective alignment with the poles, the first section being aligned with the first poles of the C-cores and the other section being aligned with the second poles of the C-cores, whereby a magnetic circuit is created through the poles and the magnetic coupling means for the transmission of magnetic flux through the barrier.

3. The system of claim 2, further including means for moving the magnetic coupling means out of alignment with the C-cores so as to prevent transmission of flux from one C-core to the other.

4. The apparatus of claim 3, wherein the optical loop comprises a light emitting source connected to the secondary winding and an optical detector connected via the base of a transistor to the oscillating circuit wherein the optical loop switches the oscillating circuit off upon the voltage in the secondary winding exceeding a threshold level interrupting transmission of flux between the primary and secondary cores.

5. The apparatus of claim 1, wherein the optical loop comprises a light emitting source connected to the secondary winding and an optical detector connected via the base of a transistor to the oscillating circuit wherein the optical loop switches the oscillating circuit off upon the voltage in the secondary winding exceeding a threshold level interrupting transmission of flux between the primary and secondary cores.

6. The system of claim 5, wherein each of the primary and secondary cores are C-cores having a pair of poles, the C-cores being positioned with the poles facing across the barrier and angularly displaced 90° from one another;

the magnetic coupling means having two magnetically insulated sections and being disposed in the first position in selective alignment with the poles, the first section being aligned with the first poles of the C-cores and the other section being aligned with the second poles of the C-cores, whereby a magnetic circuit is created through the poles and the magnetic coupling means for the transmission of magnetic flux through the barrier.

* * * * *